(12) United States Patent
Shivnaraine et al.

(10) Patent No.: US 9,959,536 B1
(45) Date of Patent: May 1, 2018

(54) CURRENT-MODE HYSTERESIS COMPARATOR

(71) Applicant: Square, Inc., San Francisco, CA (US)

(72) Inventors: Ravi Shivnaraine, Brampton (CA);
Yue Yang, Thornhill (CA); Alain Rousson, Toronto (CA); Kajornsak Julavittayanukool, Toronto (CA);
Afshin Rezayee, Richmond Hill (CA)

(73) Assignee: Square, Inc., San Francisco, CA (US)

( * ) Notice: Subject to any disclaimer, the term of this patent is extended or adjusted under 35 U.S.C. 154(b) by 3 days.

(21) Appl. No.: 15/283,526

(22) Filed: Oct. 3, 2016

(51) Int. Cl.
| | | |
|---|---|---|
| *G06Q 20/32* | (2012.01) | |
| *H04B 5/00* | (2006.01) | |
| *H04B 1/16* | (2006.01) | |
| *H03F 3/45* | (2006.01) | |
| *H03G 1/00* | (2006.01) | |
| *H03F 3/19* | (2006.01) | |

(52) U.S. Cl.
CPC ..... *G06Q 20/3278* (2013.01); *G06Q 20/3226* (2013.01); *H03F 3/19* (2013.01); *H03F 3/45071* (2013.01); *H03G 1/0088* (2013.01); *H04B 1/16* (2013.01); *H04B 5/0031* (2013.01); *H03F 2200/156* (2013.01); *H03F 2200/451* (2013.01); *H03F 2200/504* (2013.01); *H03F 2200/78* (2013.01); *H03F 2203/45074* (2013.01)

(58) Field of Classification Search
CPC combination set(s) only.
See application file for complete search history.

(56) References Cited

U.S. PATENT DOCUMENTS

2011/0267018 A1* 11/2011 Tao ..................... H02M 3/1563
323/282

FOREIGN PATENT DOCUMENTS

JP            53059352 A  *  5/1978  ............... H03K 5/24

* cited by examiner

*Primary Examiner* — Junpeng Chen
(74) *Attorney, Agent, or Firm* — Maynard Cooper & Gale, P.C.; Brian T. Sattizahn, Esq.

(57) ABSTRACT

A comparator can incorporate a hysteresis circuit to control when the output of the comparator changes between a high voltage signal and a low voltage signal. The comparator can receive a differential signal and can output either the high voltage signal or the low voltage signal. When the differential input signal is above a first threshold voltage, the output of the comparator can transition to the high voltage signal and when the differential input signal is below a second threshold voltage, the output of the comparator can transition to the low voltage signal. The hysteresis circuit of the comparator is used to adjust the first threshold voltage and the second threshold voltage required to transition the output of the comparator based on the present state of the output signal of the comparator.

28 Claims, 5 Drawing Sheets

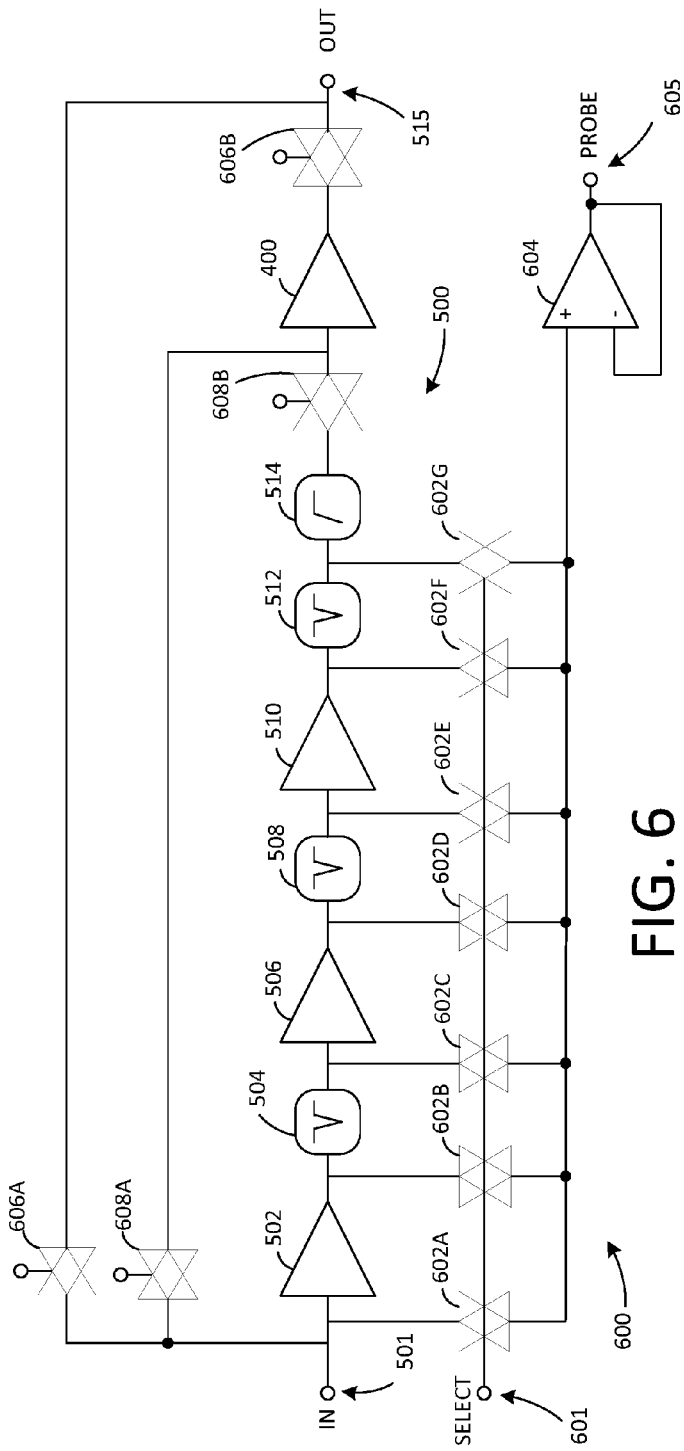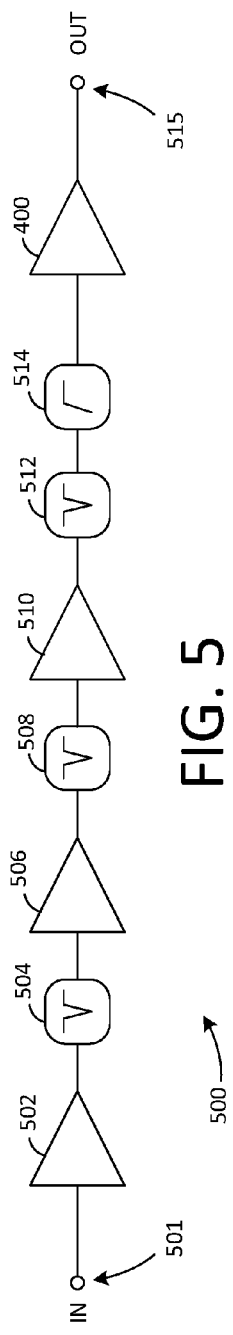
FIG. 6
FIG. 5

CURRENT-MODE HYSTERESIS COMPARATOR

BACKGROUND

Merchants can implement different types of payment systems in order to receive payments from customers. One type of payment system is a wireless and contactless payment system that uses near field communication (NFC) hardware and protocols. In an NFC-based contactless payment system, the merchant uses a reader device to wirelessly obtain payment information from a contactless payment device provided by the customer. The contactless payment device can include smart chip cards implementing the EMV (Europay, Mastercard, Visa) standard and portable electronic devices, such as smartphones or smart watches, that communicate via NFC and comply with payment standards.

In order to communicate with the contactless payment devices using NFC, the reader device emits a wireless carrier signal from an antenna, for example, at 13.56 MHz. The contactless payment device also has an antenna. When the contactless payment device is placed in close proximity to the reader, the two devices are inductively coupled via the wireless carrier signal. The contactless payment device is able to modulate the wireless carrier signal, for example, by modifying a load that is placed across the antenna of the contactless payment device. The reader device may receive the modulated wireless carrier signal from the payment device and process the signal to obtain the data from the payment device.

The reader device can be incorporated into a payment terminal that is used to process payment transactions and interact with payment devices. In order to ensure accurate processing of payment transactions, the reader device, and more specifically the NFC receiver of the reader device, has to accurately extract the payment information from the modulated wireless carrier signal sent by the contactless payment device. Merchants and consumers attempting to complete a payment transaction may become frustrated if errors occur during payment transactions or the payment transactions are not otherwise processed accurately due to the NFC receiver improperly extracting the payment information.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 5 depicts an illustrative block diagram of certain components of a signal conditioning device in accordance with some embodiments of the present disclosure; and FIG. 6 depicts an example schematic diagram of certain components of a monitoring circuit for an NFC receiver in accordance with some embodiments of the present disclosure.

DETAILED DESCRIPTION

Figure 1:
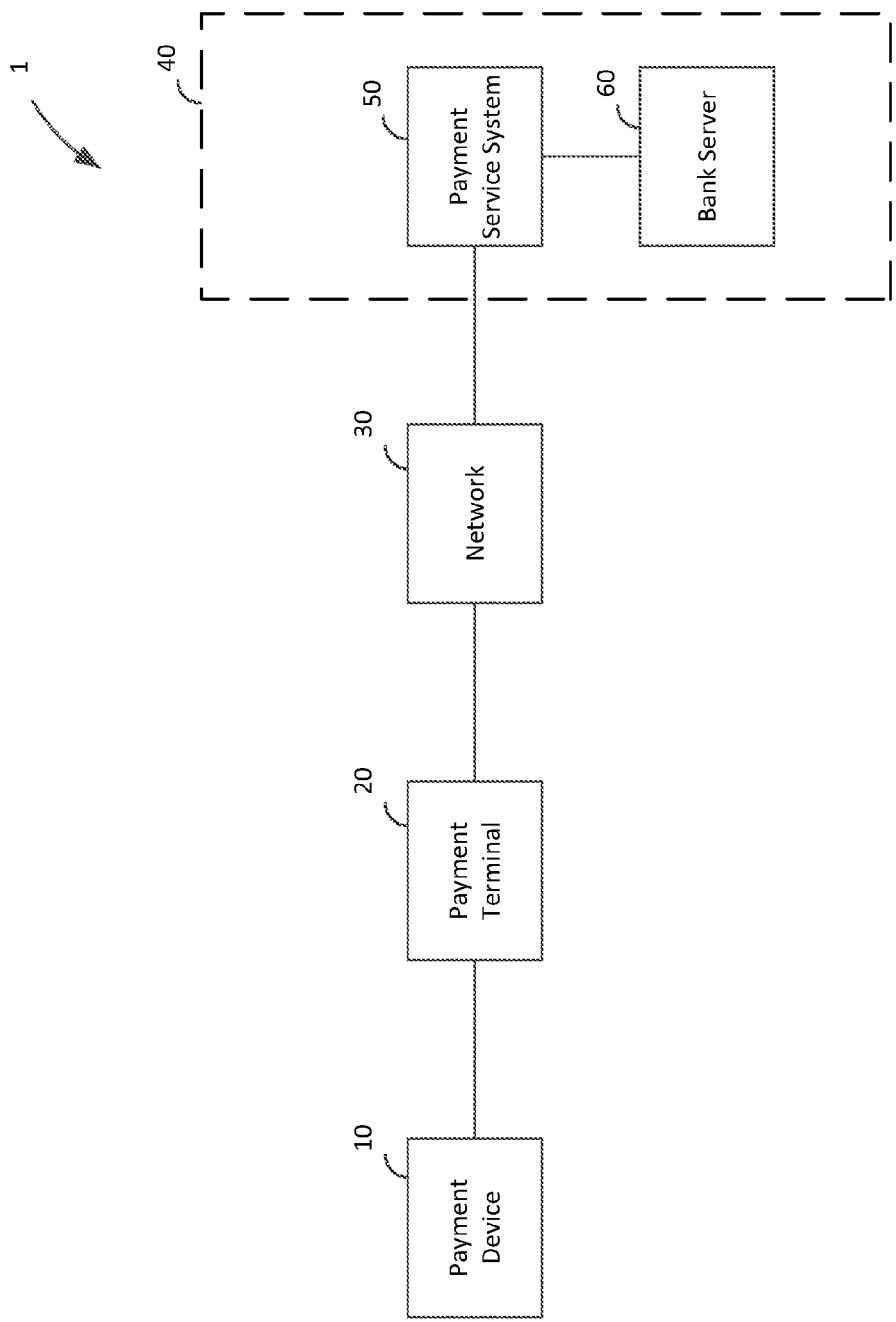
FIG. 1 shows an illustrative block diagram of a payment system in accordance with some embodiments of the present disclosure.

A comparator of a near field communication (NFC) device can incorporate a hysteresis circuit to control when the output of the comparator changes between a high voltage signal and a low voltage signal. The comparator can receive a differential input signal and can output a logical signal (i.e., a high voltage signal for a logical 1 or a low voltage signal for a logical 0) based on the relative value of the differential signal inputs. In an embodiment, hysteresis may be incorporated into the comparator which may modify the relative value of the differential input that results in a change in the output logical signal.

The comparator circuit can include a buffer circuit that receives the differential signal (e.g., based on a plurality of inputs to the comparator) and provides an output differential signal to an amplifier circuit (e.g., based on the differential between a plurality of outputs). The amplifier circuit provides the comparator output signal (i.e., the logical signal) based on the voltage of the output signal provided to the amplifier circuit. If the output differential signal has a positive voltage, the comparator output is the high voltage signal and if the output differential signal has a negative voltage, the comparator output is the low voltage signal. The output differential signal from the buffer circuit is based on the differential input signal and is provided to the amplifier circuit at a positive node and a negative node. The output differential signal can be positive when the differential input signal is above the first threshold voltage and can be negative when the differential input signal is below the second threshold voltage.

The hysteresis circuit of the comparator is used to adjust the output differential signal from the buffer circuit based on the output signal (i.e., the high voltage signal or the low voltage signal) from the comparator, and thereby adjust the first threshold voltage and the second threshold voltage required to transition the output differential signal and the output of the comparator. When the output signal is the high voltage signal, a first switching element of the hysteresis circuit can be on and provide a hysteresis current to the negative node of the buffer circuit. When the output signal is the low voltage signal, a second switching element of the hysteresis circuit can be on and provide the hysteresis current to the positive node of the buffer circuit. The hysteresis current is conducted by a load resistor at the corresponding node (i.e., the positive node or the negative node) of the buffer circuit depending on the output signal from the comparator. The conducting of the hysteresis current by the corresponding load resistor can adjust the voltage at the corresponding node, which thereby adjusts the output differential signal from the buffer circuit. The buffer circuit can include a differential pair of transistors configured to have a unity gain, such that an adjustment of the voltage at the positive node or negative node is translated to an adjustment of the first threshold voltage or the second threshold voltage (depending on which node has the voltage adjustment). The hysteresis current is provided by an adjustable current source. The level of the hysteresis current from the adjustable current source can be selected to obtain a desired voltage level for the first threshold voltage and the second threshold voltage. A larger hysteresis current can result in a larger first threshold voltage or second threshold voltage and a smaller hysteresis current can result in a smaller first threshold voltage or second threshold voltage.

A NFC receiver chain may process the signal from the payment device received by the NFC antenna. The NFC receiver chain can include one or more amplifier stages and one or more filter stages. The amplifier stages and the filter stages can be alternated such that a filter stage follows an amplifier stage. In one embodiment, the amplifier stages can incorporate variable gain amplifiers. The gain of the amplifiers can be adjusted such that the input signal to the NFC receiver chain receives the appropriate amount of gain. A monitoring circuit may also be coupled to the NFC receiver chain to monitor the voltage at different stages of the NFC receiver chain. The monitoring circuit can use transmission gates to couple each of the nodes of the NFC receiver chain to be monitored to an output buffer circuit. An input signal can be provided to select the transmission gate corresponding to the node of the NFC receiver to be monitored, while leaving the remaining transmission gates in an inactive state. The signal from the selected transmission gate, which corresponds to the voltage at the node of the NFC receiver, is provided to the output buffer circuit. The output buffer circuit can amplify the received signal to send the signal "off-chip" without interfering with the operation of the NFC receiver chain.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
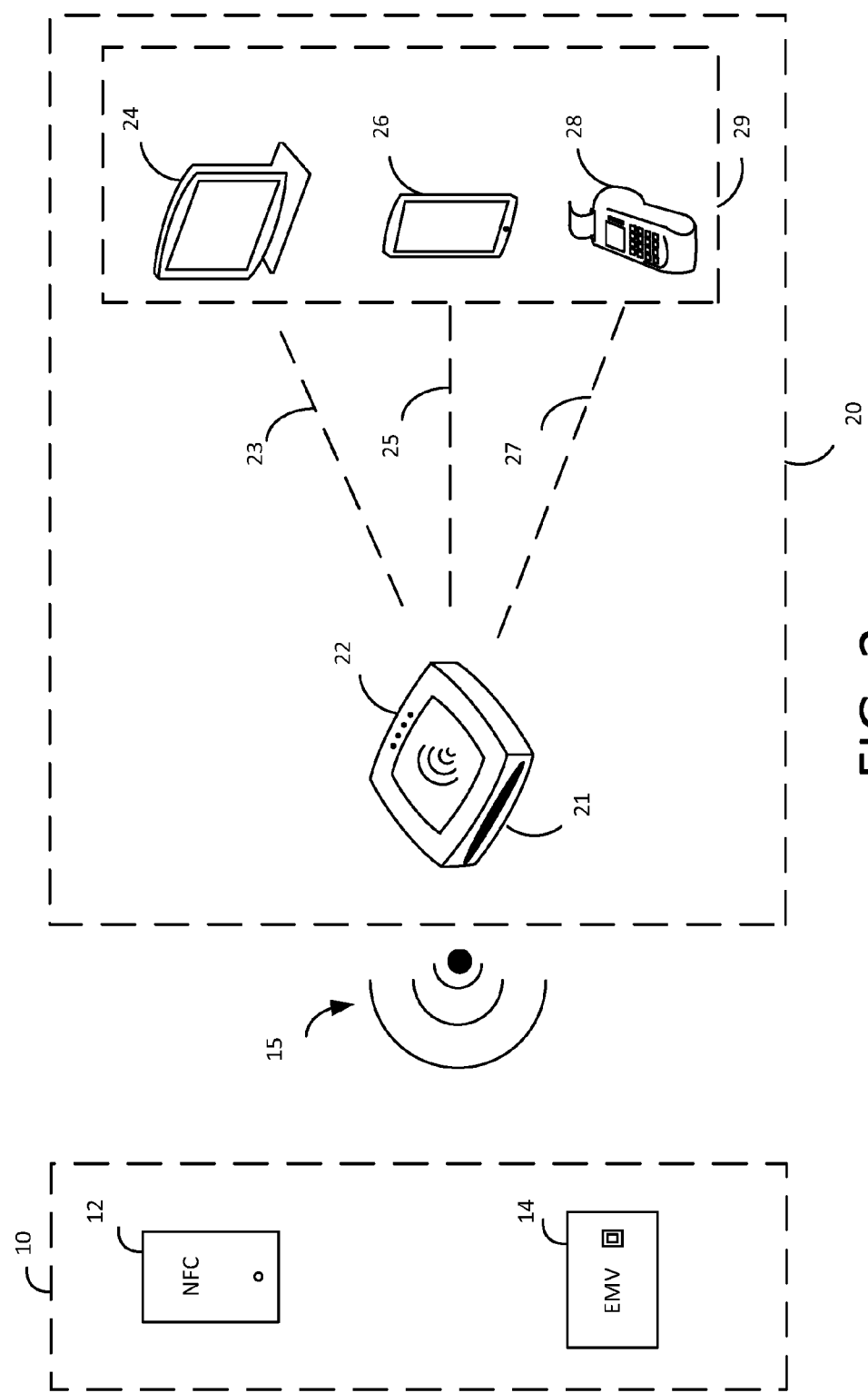
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 executes a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
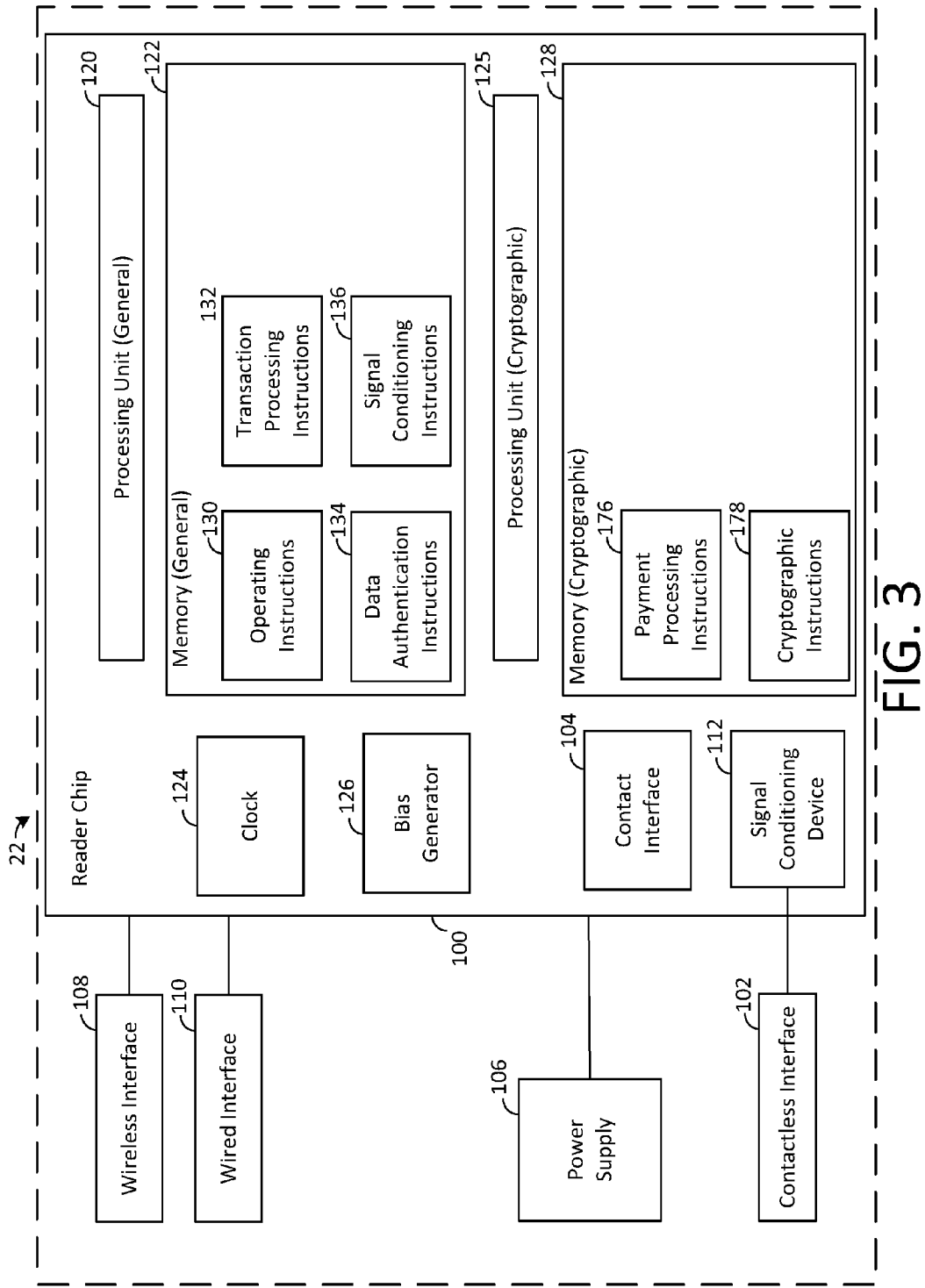
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner.

In one embodiment, payment reader 22 includes a reader chip 100, a plurality of payment interfaces (e.g., a contactless interface 102 and a contact interface 104), a power supply 106, a wireless communication interface 108, a wired communication interface 110, and a signal conditioning device 112. Payment reader 22 (e.g., reader chip 100 of payment reader 22) may also include a general processing unit 120 (e.g., a terminal/reader processing unit), general memory 122, a cryptographic processing unit 125 and cryptographic memory 128. Although in one embodiment the processing units and memories will be described as packaged in a reader chip 100, and configured in a particular manner, it will be understood that general processing unit 120, general memory 122, a cryptographic processing unit 125 and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

In some embodiments, reader chip 100 may be any suitable chip. Processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front-end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry). In some embodiments, the additional circuitry may include components such as a comparator having a modifiable hysteresis, as described herein.

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.) may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include analog front-end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information. Note that, in some embodiments, contact interface 104 may be housed on reader chip 100 and may communicate with the various components of reader chip 100 via any suitable means (e.g., a common internal bus).

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, reader chip 100 may include a signal conditioning device 112. The signal conditioning device 112 may include any suitable hardware, software, or any combination thereof. Signal conditioning device 112 may receive and condition signals sent from contactless interface 102, such as when a payment device 10 using NFC communication communicates with payment reader 22. In an embodiment, signal conditioning device 112 may operate based on instructions stored at reader chip 100 (e.g., signal conditioning instructions 136) for use in interacting with the contactless interface 102.

In some embodiments, general memory 122 may be any suitable memory as described herein, and may include a plurality of sets of instructions for controlling operations of payment reader 22 and performing general transaction processing operations of payment reader 22, such as operating instructions 130, transaction processing instructions 132, data authentication instructions 134 and signal conditioning instructions 136.

Operating instructions 130 may include instructions for controlling general operations of the payment reader 22, such as internal communications, power management, processing of messages, system monitoring, sleep modes, user interface response and control, operation of the contact interface 104, the wireless interface 108, the wired interface 110, or the signal conditioning device 112, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Signal conditioning instructions 136 may include instructions for conditioning signals received from a payment device 10 via the contactless interface 102 (e.g., from a NFC payment device 12). Although in some embodiments, signal conditioning instructions 136 may include instructions for manipulating signals received via contactless interface 102, signal conditioning instructions 136 may include instructions for conditioning signals, including signals that are initially processed by signal conditioning hardware, such as signal conditioning device 112.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

The reader chip 100 may also include a clock 124 and bias generator 126. Bias generator 126 may be connected to the power supply 106 and may generate one or more bias voltages that are provided to components of reader chip 100 such as contact interface 104, processing unit 120, and memory 122. In one embodiment, a suitable bias voltage generated by bias generator 126 may be 3.3 volts. Clock 124 may include a clock source (not depicted) and a clock management unit (not depicted). The clock source may be any suitable clock source such as a crystal oscillator and may provide a clock signal at a clock frequency to the clock management unit. The clock management unit may generate a plurality of clock signals (to be output by clock 124) based on the input from the clock source, for example, a clock signal for processing unit 120 and a clock signal having a suitable frequency for transmission for near field communications (e.g., 13.56 MHZ).

Figure 4:
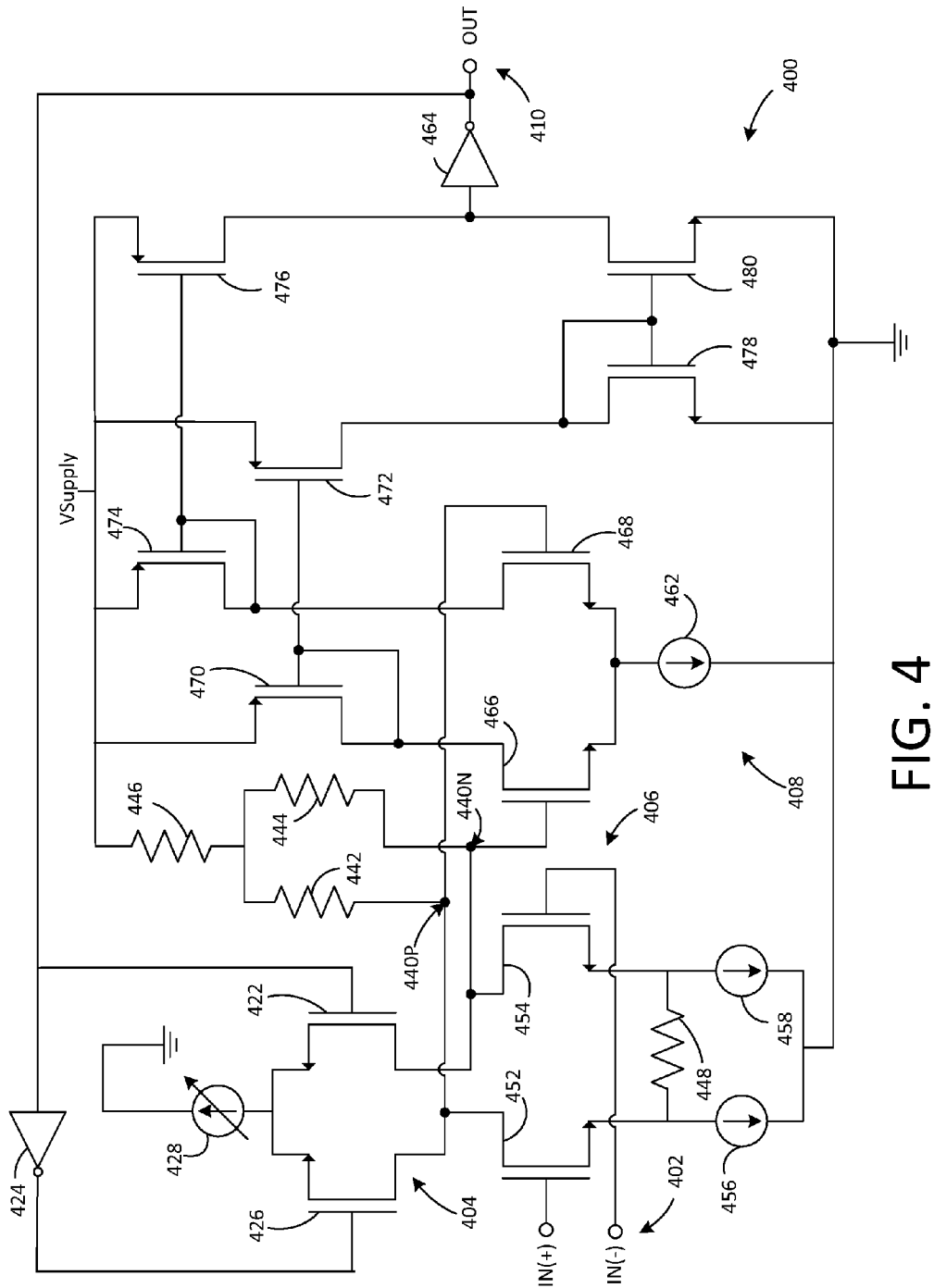
FIG. 4 depicts an example schematic diagram of certain components of a comparator in accordance with some embodiments of the present disclosure.

FIG. 4 depicts an example schematic diagram of certain components of a comparator in accordance with some embodiments of the present disclosure. In an embodiment, the components and circuitry depicted in FIG. 4 may correspond to a comparator 400 having variable hysteresis that converts a differential signal to a logical signal. Although particular components are depicted in the particular arrangement of FIG. 4, it will be understood that the comparator 400 may include additional components, one or more of the components depicted in FIG. 4 may not be included in the comparator 400, and the components of the comparator 400 may be rearranged in any suitable manner. In one embodiment, the comparator 400 includes at least a differential input connection 402, a hysteresis circuit 404, a buffer circuit 406, an amplifier circuit 408, and a logical output connection 410.

The output connection 410 of the comparator 400 can be connected to the hysteresis circuit 404 in a feedback loop to provide the output signal (of the comparator 400) to the hysteresis circuit 404. The hysteresis circuit 404 uses the output signal from the output connection 410 to selectively provide a hysteresis signal to the buffer circuit 406. The buffer circuit 406 receives the input differential signal from the input connection 402 and generates a voltage differential for the amplifier circuit 408 based on the input differential signal and the hysteresis signal from the hysteresis circuit 404. The amplifier circuit 408 can output a high output voltage (i.e., a logical 1) at the output connection 410 when the differential voltage from the buffer circuit 406 is positive and can output a low output voltage (i.e., a logical 0) at the output connection 410 when the differential voltage from the buffer circuit 406 is negative.

The hysteresis circuit 404 can provide the hysteresis signal to the positive output node 440P of the buffer circuit 406 when the output signal from the output connection 410 is "low" (i.e., a low output voltage) or a logical 0 or to the negative output node 440N of the buffer circuit 406 when the output signal from the output connection 410 is "high" (i.e., a high output voltage) or a logical 1. In the hysteresis circuit 404, the output signal from the output connection 410 can be provided to a switching input of first switching element 422, which in turn selectively opens or closes a circuit that is coupled to the negative output node 440N. The output signal from the output connection 410 can also be passed through an inverter 424 and then provided to a second switching element 426. Both the first switching element 422 and the second switching element 426 can be coupled to an adjustable current source 428.

The adjustable current source 428 can be used to provide a selectable output current (selected from among a plurality of different current levels) to one of the output nodes 440P or 440N depending on which of the first switching element 422 or the second switching element 426 is in an "on" state (i.e., operating as a short circuit). In an embodiment, the selection of a particular current to be output by the adjustable current source 428 is controlled by a digital input based on instructions stored at reader chip 100 (e.g., operating instructions 130 and/or signal conditioning instructions 136). In one embodiment, the adjustable current source 428 can have one of sixteen different output currents that can vary from a minimum current (e.g., 0 A (amperes)) to a maximum current. The different output currents can be equally spaced (i.e., the difference in current between levels is the same) or unequally spaced (i.e., the difference in current between levels can vary). The adjustable current source 428 can provide a current that is inversely proportional to the sheet resistance of the load resistors 442, 444, and 446 of the buffer circuit 406. The load resistors 442, 444, and 446 can each be a polysilicon resistor in one embodiment, but can also be other types of resistors in other embodiments. In another embodiment, the resistance for load resistors 442 and 446 can be equal to the resistance for load resistors 444 and 446, which can result in load resistor 442 having an equal resistance to load resistor 444. The current from the adjustable current source 428 when driven into the load resistors 442, 444, and 446 can produce a fixed or constant voltage over process and temperature at the corresponding output node 440P or 440N.

In one embodiment, the adjustable current source 428 can include one or more transistors and one or more resistors. However, other configurations of the adjustable current source 428 are possible in other embodiments. In another embodiment, the current from the adjustable current source 428 can be provided from an analog front end (AFE) circuit on the reader chip 100.

The first switching element 422 can be switched to an "on" state when the output signal from the output connection 410 is "high". When the first switching element 422 is in the "on" state, the first switching element 422 connects the adjustable current source 428 and the output node 440N. The first switching element 422 can be switched to an "off" state (i.e., operating as an open circuit) when the output signal from the output connection 410 is "low." When the first switching element 422 is in the "off" state, the adjustable current source 428 is no longer coupled to the output node 440N. The second switching element 426 can be switched to an "on" state when the signal output from the inverter 424 is "high," which corresponds to the output signal from the output connection 410 being "low." When the second switching element 426 is in the "on" state, the second switching element 426 connects the adjustable current source 428 and the output node 440P. The second switching element 426 can be switched to an "off" state when the signal output from the inverter 424 is "low," which corresponds to the output signal from the output connection 410 being "high." When the second switching element 426 is in the "off" state, the adjustable current source 428 is no longer coupled to the output node 440P. Since the first switching element 422 and the second switching element 426 receive signals in opposite states, one of the first switching element 422 or the second switching element 426 is in the "on" state and the other of the first switching element 422 and the second switching element 426 is in the "off" state. In one embodiment, the first switching element 422 and the second switching element 426 can each be a p-channel MOSFET (metal oxide semiconductor field effect transistor). However, the first switching element 422 and the second switching element 426 can use other types of transistors (e.g., a bipolar junction transistor (BJT) or a junction field effect transistor (JFET)) or other switching configurations using other components (e.g., a physical switch or other semiconductor devices) in other embodiments.

The buffer circuit 406 includes a differential pair that receives the differential input signal from the input connection 402. In one embodiment, the differential pair can be a current mode logic (CIVIL) input pair. The differential pair or CIVIL input pair includes a third switching element 452 and a fourth switching element 454. The third switching element 452 can be coupled to the positive line (IN(+)) of the input connection 402 and the fourth switching element 454 can be coupled to the negative line (IN(−)) of the input connection 402. In an embodiment, the third switching element 452 and the fourth switching element 454 can each be a p-channel MOSFET. However, the third switching element 452 and the fourth switching element 454 can use other types of transistors (e.g., a bipolar junction transistor (BJT) or a junction field effect transistor (JFET)) or other switching configurations using other components (e.g., a physical switch or other semiconductor devices) in other embodiments.

The third switching element 452 is coupled to a first current source 456 and the fourth switching element 454 is coupled to a second current source 458. A source degeneration resistor 448 can be coupled between the third switching element 452 and the fourth switching element 454 to limit the gain of the buffer circuit 406 to about 1. The source degeneration resistor 448 can be a polysilicon resistor in one embodiment, but can also be another type of resistor in other embodiments. The current from the current sources 456 and 458 when driven into the source degeneration resistor 448 can produce a fixed or constant voltage over process and temperature and thus maintain a fixed gain for the buffer circuit 406.

In one embodiment, the first current source 456 and the second current source 458 can have equal currents. The first current source 456 and the second current source 458 can provide currents that are inversely proportional to the sheet resistance of the load resistors 442, 444, and 446 and source degeneration resistor 448. The current from the first current source 456 and the second current source 458 when driven into the load resistors 442, 444, and 446 can produce a fixed or constant voltage over process and temperature at the corresponding output node 440P or 440N. In another embodiment, the first current source 456 and the second current source 458 can each include one or more transistors and one or more resistors. However, other configurations of the first current source 456 and the second current source 458 are possible in other embodiments. In a further embodiment, the current from the first current source 456 and the second current source 458 can be provided from an analog front end (AFE) circuit on the reader chip 100.

The value of the differential voltage at the input connection 402 (i.e., the voltage on the positive line (IN(+)) minus the voltage on the negative line (IN(−))) can control the voltages at the output nodes 440P and 440N and thus, the differential voltage (i.e., the voltage at output node 440P minus the voltage at output node 440N) from the buffer circuit 406. In one embodiment, when the differential voltage at the input connection 402 is positive (i.e., the voltage on the positive line (IN(+)) is greater than the voltage on the negative line (IN(−))), the voltage at the output node 440P can be equal to the supply voltage (VSupply) connected to the load resistors 442, 444 and 446 and the voltage at the output node 440N can be at a reduced voltage equal to the supply voltage minus the voltage drop across load resistors 444 and 446 resulting from the current associated with the second current source 458. In one embodiment, VSupply can be 3.3 V, but VSupply can have different voltage values in other embodiments. When the differential voltage at the input connection 402 is negative (i.e., the voltage on the positive line (IN(+)) is less than the voltage on the negative line (IN(−))), the voltage at the output node 440N can be equal to the supply voltage (VSupply) and the voltage at the output node 440P can be at a reduced voltage equal to the supply voltage minus the voltage drop across load resistors 442 and 446 resulting from the current associated with the first current source 456. The difference in voltage between output node 440P and output node 440N can follow the differential voltage at the input connection 402. In other words, when the differential voltage at the input connection 402 is positive, the difference in voltage between output node 440P and output node 440N can be positive and when the differential voltage at the input connection 402 is negative, the difference in voltage between output node 440P and output node 440N can be negative.

In some embodiments, the difference in voltage between output node 440P and output node 440N is also affected by the hysteresis signal from the hysteresis circuit 404. The hysteresis signal from the hysteresis circuit 404 incorporates an additional hysteresis threshold that alters when the difference in in voltage between output node 440P and output node 440N changes between positive and negative. As discussed above, the hysteresis signal is provided to either the output node 440N if the output signal from output connection 410 is "high" or the output node 440P if the output signal from the output connection 410 is "low."

When the hysteresis signal is applied to the output node 440N, the hysteresis signal lowers the voltage at the output node 440N by a hysteresis threshold voltage corresponding to the voltage drop across load resistors 444 and 446 resulting from the current associated with the adjustable current source 428. Thus, when the differential voltage at the input connection 402 changes from positive to negative, the increasing voltage at output node 440N (which is increasing toward the supply voltage from the reduced voltage level discussed above) has to be greater than the hysteresis threshold voltage and the decreasing voltage at output node 440P (which is decreasing from the supply voltage to the reduced voltage level discussed above) before the difference in voltage between output node 440P and output node 440N becomes negative. The application of the hysteresis signal to the output node 440N results in the differential voltage at the input connection 402 having to be less than a first input voltage threshold before the output signal at the output connection 410 changes from "high" to "low." In one embodiment, since the hysteresis signal is applied to the "negative" output node 440N, the first input voltage threshold can be a negative number.

When the hysteresis signal is applied to the output node 440P, the hysteresis signal lowers the voltage at the output node 440P by a hysteresis threshold voltage corresponding to the voltage drop across load resistors 442 and 446 resulting from the current associated with the adjustable current source 428. Thus, when the differential voltage at the input connection 402 changes from negative to positive, the increasing voltage at output node 440P (which is increasing toward the supply voltage from the reduced voltage level discussed above) has to be greater than the hysteresis threshold voltage and the decreasing voltage at output node 440N (which is decreasing from the supply voltage to the reduced voltage level discussed above) before the difference in voltage between output node 440P and output node 440N becomes positive. The application of the hysteresis signal to the output node 440P results in the differential voltage at the input connection 402 having to be greater than a second input voltage threshold before the output signal at the output connection 410 changes from "low" to "high." In one embodiment, the second input voltage threshold can have a magnitude equal to the magnitude of the first input voltage threshold because the load resistors 442 and 444 have equal resistances and the hysteresis current is the same through each load resistor 442 and 444.

The first input voltage threshold and the second input voltage threshold can vary based on the selected level of current associated with the hysteresis signal. The first and second input voltage thresholds can be as small as 60 mV (millivolts) or less or as large as 600 mV or greater. The use of the first and second input voltage thresholds can provide for a programmable range about the zero point of the input voltage differential (i.e., the point where the input voltage differential is 0 V) to avoid frequent switching of the comparator output in response to very small changes in the input voltage differential. In one embodiment, the programmable range can vary from less than 100 mV to greater than 1.2 V.

The first input voltage threshold and the second input voltage threshold can be based on an input referred offset and provides for symmetric rising and falling edges of the hysteresis curve controlling the transition of the output signal at output connection 410. The input referred offset can be understood as being an offset at the output (as a result of the hysteresis current) represented at the input that requires the input to "overcome" to change the state of the output. As a result of the input referred offset from the hysteresis current, the first input voltage threshold and the second input voltage threshold can be offset from a zero voltage level. In one embodiment, the unity gain of the buffer circuit 406 from the source degeneration resistor 448 can result in a one-to-one representation of the output offset voltage (i.e., the hysteresis threshold voltage) at the input such that the first input threshold voltage and the second input threshold voltage can be adjusted by the output offset voltage.

As discussed above, the difference in voltage between output node 440P and output node 440N (i.e., the output voltage difference from the buffer circuit 406) is provided to the amplifier circuit 408. The amplifier circuit can provide a "high" output when the output voltage difference from the buffer circuit 406 is positive and can provide a "low" output when the output voltage difference from the buffer circuit 406 is negative. In one embodiment, the amplifier circuit 408 can be a differential to single-ended, full swing converter that operates like a rectifier with a zero-crossing and a high gain. The amplifier circuit 408 can include a differential amplifier with a constant current source 462 and a current mirror. The output of the differential amplifier can be provided to an inverter 464 which is coupled to the output connection 410. The differential amplifier can include a differential pair or CIVIL input pair having a fifth switching element 466 and a sixth switching element 468. The fifth switching element 466 can be coupled to output node 440N of the buffer circuit 406 and the sixth switching element 468 can be coupled to the output node 440P of the buffer circuit 406. In one embodiment, the fifth switching element 466 and the sixth switching element 468 can each be a p-channel MOSFET. However, the fifth switching element 466 and the sixth switching element 468 can use other types of transistors (e.g., a bipolar junction transistor (BJT) or a junction field effect transistor (JFET)) or other switching configurations using other components (e.g., a physical switch or other semiconductor devices) in other embodiments.

The current mirror can include seventh switching element 470 and eighth switching element 472 coupled to fifth switching element 466 and the supply voltage and ninth switching element 474 and tenth switching element 476 coupled to the sixth switching element 468 and the supply voltage. In one embodiment, the seventh switching element 470, the eighth switching element 472, the ninth switching element 474 and the tenth switching element 454 can each be an n-channel MOSFET. However, the seventh switching element 470, the eighth switching element 472, the ninth switching element 474 and the tenth switching element 454 can use other types of transistors (e.g., a bipolar junction transistor (BJT) or a junction field effect transistor (JFET)) or other switching configurations using other components (e.g., a physical switch or other semiconductor devices) in other embodiments. The amplifier circuit 408 can also include an eleventh switching element 478 and a twelfth switching element 480. The eleventh switching element 478 can be coupled to the eighth switching element 472. The twelfth switching element 480 can be coupled to the eighth switching element 472, the tenth switching element 476 and the inverter 464. In one embodiment, the eleventh switching element 478 and the twelfth switching element 480 can each be a p-channel MOSFET. However, the eleventh switching element 478 and the twelfth switching element 480 can use other types of transistors (e.g., a bipolar junction transistor (BJT) or a junction field effect transistor (JFET)) or other switching configurations using other components (e.g., a physical switch or other semiconductor devices) in other embodiments.

FIG. 5 depicts an illustrative block diagram of certain components of a signal conditioning device 112 in accordance with some embodiments of the present disclosure. In an embodiment, the components and circuitry depicted in FIG. 5 may correspond to an NFC receiver 500. Although particular components are depicted in the particular arrangement of FIG. 5, it will be understood that the NFC receiver 500 may include additional components, one or more of the components depicted in FIG. 5 may not be included in the NFC receiver 500, and the components of the NFC receiver 500 may be rearranged in any suitable manner. In one embodiment, the NFC receiver 500 includes at least an input connection 501, a first amplifier 502, a second amplifier 506, a third amplifier 510, a first filter 504, a second filter 508, a third filter 512, a fourth filter 514, a comparator 400 and an output connection 515.

The contactless interface 102 can provide the NFC receiver 500 with the modulated carrier signal from the payment device 10 at input connection 501. In one embodiment, the modulated carrier signal received at the input connection 501 can be a differential signal (even though a single line is shown at the input connection 501 in FIG. 5). The modulated carrier signal from the input connection 501 is then provided to a first amplifier 502 to boost the signal and then passed through a first filter 504 to remove certain frequencies from the signal. The signal from the first filter 504 is provided to a second amplifier 506 to boost the signal and then passed through a second filter 508 to remove certain frequencies from the signal. The signal from the second filter 508 is provided to a third amplifier 510 to boost the signal and then passed through a third filter 512 to remove certain frequencies from the signal. The signal from the third filter 512 may then be passed through a fourth filter 514 to remove certain frequencies from the signal before being provided to a comparator circuit 400. The comparator circuit 400 takes the differential signal from the third filter 512 (or the fourth filter 514, if used) and converts the differential signal to a logical signal. In one embodiment, the comparator circuit 400 may be the comparator circuit from FIG. 4, but other comparator circuits having hysteresis may be used in other embodiments.

In one embodiment, the first filter 504, the second filter 508 and the third filter 512 can each be a notch filter centered about a predetermined frequency. The first filter 504 and the third filter 512 can each have a predetermined frequency of 13.56 MHz (megahertz) and the second filter 508 can have a predetermined frequency of 27.12 MHz. The fourth filter 514 can be a high pass filter having a predetermined cutoff frequency in an embodiment.

In an embodiment, each of the first amplifier 502, the second amplifier 506 and the third amplifier 510 can be a variable gain amplifier that is adjustable to obtain a desired input to the comparator 400. In an embodiment, the gain of each of the first amplifier 502, the second amplifier 506 and the third amplifier 510 may be set based on instructions stored at reader chip 100 (e.g., signal conditioning instructions 136). The gain of each of the first amplifier 502, the second amplifier 506 and the third amplifier 510 can be established by the control instructions such that the resultant fixed input signal to the comparator 400 has the proper scaling for the hysteresis levels established in the comparator 400. In other words, the gain for each of the first amplifier 502, the second amplifier 506 and the third amplifier 510 can be set such that a corresponding input signal at input connection 501 is able to properly toggle the output of the comparator 400.

FIG. 6 depicts an example schematic diagram of certain components of an NFC receiver 500 in accordance with some embodiments of the present disclosure. In an embodiment, the components and circuitry depicted in FIG. 6 may correspond to a monitoring circuit 600 for an NFC receiver 500 having a buffer to drive a tapped node off-chip. Although particular components are depicted in the particular arrangement of FIG. 6, it will be understood that the monitoring circuit 600 may include additional components, one or more of the components depicted in FIG. 6 may not be included in the monitoring circuit 600, and the components of the monitoring circuit 600 may be rearranged in any suitable manner. In one embodiment, the monitoring circuit 600 includes at least an input connection 601, a plurality of gates 602A-602G connected to the NFC receiver 500 at different locations, a buffer circuit 604, and an output connection 605.

A monitoring circuit 600 can be coupled to an NFC receiver 500 to monitor the analog voltage at selected nodes of the NFC receiver 500 without disturbing the operation of the NFC receiver 500. The monitoring circuit 600 can be coupled to the NFC receiver 500 at nodes before each of the first amplifier 502, the second amplifier 506, the third amplifier 510, the first filter 504, the second filter 508 and the third filter 512. The monitoring circuit can also be coupled to the NFC receiver 500 at a node after the filter 512 (or before the fourth filter 514, if used). The monitoring circuit 600 can use a corresponding gate to couple to each of the nodes of the NFC receiver 500. In one embodiment, gate 602A can be used to couple the monitoring circuit 600 to the node before the first amplifier 502, gate 602B can be used to couple the monitoring circuit 600 to the node before the first filter 504, gate 602C can be used to couple the monitoring circuit 600 to the node before the second amplifier 506, gate 602D can be used to couple the monitoring circuit 600 to the node before the second filter 508, gate 602E can be used to couple the monitoring circuit 600 to the node before the third amplifier 510, gate 602F can be used to couple the monitoring circuit 600 to the node before the third filter 512 and gate 602G can be used to couple the monitoring circuit 600 to the node after the third filter 512. In one embodiment, the gates 602A-602G can each be transmission gates using MOSFETs, but can use other types of transistors (e.g., a bipolar junction transistor (BJT) or a junction field effect transistor (JFET)) or other switching configurations using other components (e.g., a physical switch or other semiconductor devices) in other embodiments.

The monitoring circuit 600 can receive an input select signal at input connection 601. The input select signal is used to select one of the gates 602A-602G to be active (i.e., a closed circuit) and maintain the remaining gates in an inactive state (i.e., an open circuit). In an embodiment, the input select signal provided to the monitoring circuit 600 may be based on instructions stored at reader chip 100 (e.g., signal conditioning instructions 136). In response to the input select signal, the selected gate can provide an analog signal corresponding to the analog voltage at the corresponding node of the NFC receiver 500 to a buffer circuit 604. The buffer circuit 604 can be used to provide an output probe signal at output connection 605. In an embodiment, the buffer circuit 604 can drive the output probe signal off of the reader chip 100 for further processing. In an embodiment, the buffer circuit 604 can be a "rail-to-rail" buffer that incorporates an operational amplifier with negative feedback. The analog signal from the selected gate can be provided to the non-inverting input of the amplifier. The amplifier of the buffer circuit 604 can be used to raise the voltage of the analog signal at the selected node before providing the signal to the output connection 605.

In an embodiment, the NFC receiver 500 can also have two bypass connections that can be used to bypass portions of the NFC receiver 500. A first bypass connection can be used to bypass the entire NFC receiver 500 and provide the signal at the input connection 501 directly to the output connection 515. The first bypass connection can include a first gate 606A coupled to the input connection 501 and a second gate 606B coupled to the output connection 515. The first gate 606A can receive a first control signal and the second gate 606B can receive the inverse of the first control signal. Thus, when the first gate 606A receives an instruction to close (i.e., enter the active state), the second gate 606B receives an instruction to open (i.e., enter the inactive state). Similarly, when the first gate 606A receives an instruction to open (i.e., enter the inactive state), the second gate 606B receives an instruction to close (i.e., enter the active state).

A second bypass connection can be used to bypass most of the NFC receiver 500 and provide the signal at the input connection 501 directly to the comparator 400. The first bypass connection can include a third gate 608A coupled to the input connection 501 and a fourth gate 608B coupled to the comparator 400. The third gate 608A can receive a second control signal and the fourth gate 608B can receive the inverse of the second control signal. Thus, when the third gate 608A receives an instruction to close (i.e., enter the active state), the fourth gate 608B receives an instruction to open (i.e., enter the inactive state). Similarly, when the third gate 608A receives an instruction to open (i.e., enter the inactive state), the fourth gate 608B receives an instruction to close (i.e., enter the active state).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A comparator circuit having variable hysteresis, comprising:
    a comparator output configured to output a high output voltage or a low output voltage;
    a first voltage selection circuit having a first voltage input to receive a first voltage, and configured to selectively provide the high output voltage to the comparator output when the first voltage exceeds a second voltage by more than a first voltage threshold;
    a second voltage selection circuit having a second voltage input coupled to receive the second voltage, and configured to selectively provide the low output voltage to the comparator output when the second voltage exceeds the first voltage by more than a second voltage threshold;
    a hysteresis current source, wherein a hysteresis current supplied by the hysteresis current source is selectable;
    an output feedback circuit coupled to the comparator output and the hysteresis current source, wherein the output feedback circuit is configured to supply the hysteresis current to the first voltage selection circuit when the comparator output is at the low output voltage and to supply the hysteresis current to the second voltage selection circuit when comparator output is at the high output voltage;
    a first load resistor coupled to the first voltage selection circuit to conduct the hysteresis current when the hysteresis current is supplied to the first voltage selection circuit, and wherein the first voltage threshold is changed based on the hysteresis current conducted by the first load resistor; and
    a second load resistor coupled to the second voltage selection circuit to conduct the hysteresis current when the hysteresis current is supplied to the second voltage selection circuit, and wherein the second voltage threshold is changed based on the hysteresis current conducted by the second load resistor.

2. The comparator circuit of claim 1, wherein the first voltage selection circuit and the second voltage selection circuit comprise an amplifier circuit.

3. The comparator circuit of claim 1, wherein the output feedback circuit comprises a first switching element coupled to the first voltage selection circuit and a second switching element coupled to the second voltage selection circuit.

4. The comparator circuit of claim 1, wherein the change in the first voltage threshold based on the hysteresis current conducted by the first load resistor is independent of temperature variations and the change in the second voltage threshold based on the hysteresis current conducted by the second load resistor is independent of temperature variations.

5. A comparator having hysteresis, comprising:
    an input connection;
    an output connection;
    a first circuit coupled to the input connection to receive an input differential voltage signal from the input connection, the first circuit configured to provide an output differential voltage signal based on the input differential voltage signal, the first circuit comprising a first node coupled to a first resistor and a second node coupled to a second resistor;

a second circuit coupled to the first circuit and the output connection, the second circuit configured to receive the output differential voltage signal from the first circuit, the second circuit configured to provide a logical output signal at the output connection based on the output differential voltage signal, wherein the logical output signal is a first output voltage in response to the output differential voltage signal being a positive voltage and a second output voltage in response to the output differential voltage signal being a negative voltage;

a third circuit coupled to the output connection, the third circuit receiving the logical output signal from the second circuit and providing a hysteresis current to one of the first node or the second node, wherein the third circuit provides the hysteresis current to the first node in response to the logical output signal being the second output voltage and provides the hysteresis current to the second node in response to the logical output signal being the first output voltage, the first resistor configured to provide a first offset voltage in response to conducting the hysteresis current and the second resistor configured to provide a second offset voltage in response to conducting the hysteresis current; and wherein the output differential voltage signal transitions from the positive voltage to the negative voltage in response to the input differential voltage signal having a negative value that is less than a negative value of the second offset voltage and the output differential voltage signal transitions from the negative voltage to the positive voltage in response to the input differential voltage signal being greater than the first offset voltage.

6. The comparator of claim 5, wherein the third circuit comprises an adjustable current source to provide the hysteresis current.

7. The comparator of claim 6, wherein the adjustable current source is configured to provide a plurality of different current levels based on an input selection signal.

8. The comparator of claim 6, wherein the third circuit comprises a first switching element coupled to the adjustable current source and the first node and a second switching element coupled to the adjustable current source and the second node, the first switching element configured to provide the hysteresis current to the first node in response to the third circuit receiving the second output voltage and the second switching element configured to provide the hysteresis current to the second node in response to the third circuit receiving the first output voltage.

9. The comparator of claim 8, wherein the third circuit comprises an inverter to invert the logical output signal, and wherein the first switching element receives the inverted logical output signal.

10. The comparator of claim 5, wherein the first offset voltage is independent of temperature variations and the second offset voltage is independent of temperature variations.

11. The comparator of claim 5, wherein the first circuit comprises a differential pair having a first switching element coupled to a second switching element, the first switching element connected to the first node and the second switching element connected to the second node.

12. The comparator of claim 11, wherein the first circuit comprises a third resistor coupled to the first switching element and the second switching element, wherein the first switching element, the second switching element and the third resistor are configured to provide about a unity gain for the first circuit.

13. The comparator of claim 11, wherein the first switching element is coupled to a first current source and the second switching element is coupled to a second current source.

14. The comparator of claim 5, wherein the first resistor has a resistance that is equal to a resistance of the second resistor.

15. The comparator of claim 14, wherein each of the first resistor and the second resistor comprise a polysilicon resistor.

16. The comparator of claim 15, wherein a magnitude of the first offset voltage is equal to a magnitude of the second offset voltage for the same hysteresis current and temperature.

17. A comparator, comprising:
at least one amplifier stage;
at least one filter stage coupled to the at least one amplifier stage; and
a comparator stage coupled to the at least one filter stage, the comparator stage comprising:
an input connection to receive a differential signal from the at least one filter stage;
an output connection to output a high output voltage or a low output voltage;
a voltage selection circuit having a first voltage input to receive a first voltage from the input connection and a second voltage input to receive a second voltage from the input connection, the voltage selection circuit configured to selectively provide the high output voltage to the output connection when the first voltage exceeds the second voltage by more than a first voltage threshold and to selectively provide the low output voltage to the output connection when the second voltage exceeds the first voltage by more than a second voltage threshold;
a feedback circuit coupled to the output connection and configured to supply a hysteresis current from an adjustable hysteresis current source to a first node of the voltage selection circuit when the output connection is at the low output voltage or to a second node of the voltage selection circuit when the output connection is at the high output voltage; and
wherein the voltage selection circuit comprises:
a first resistor coupled to the first node, wherein the first resistor is configured to conduct the hysteresis current when the hysteresis current is supplied to the first node, and wherein the first voltage threshold is based on the hysteresis current conducted by the first resistor; and
a second resistor coupled to the second node, wherein the second resistor is configured to conduct the hysteresis current when the hysteresis current is supplied to the second node, and wherein the second voltage threshold is based on the hysteresis current conducted by the second resistor.

18. The comparator of claim 17, further comprising a monitoring circuit coupled to the at least one amplifier stage and to the at least one filter stage, the monitoring circuit comprising a plurality of gates and a buffer circuit, the plurality of gates coupled to a plurality of nodes associated with the at least one amplifier stage and the at least one filter stage, one gate of the plurality of gates being selectable in response to an input signal, the selected gate providing a signal to the buffer circuit corresponding to a voltage at the corresponding node coupled to the selected gate.

19. The comparator of claim 18, wherein the buffer circuit comprises an amplifier to amplify the signal from the selected gate.

20. The comparator of claim 17, wherein the at least one amplifier stage comprises a variable gain amplifier.

21. The comparator of claim 20, wherein the gain of the variable gain amplifier is adjusted in response to at least one of the first voltage threshold or the second voltage threshold.

22. The comparator of claim 17, wherein the hysteresis current from the adjustable hysteresis current source is selected in response to a digital input signal.

23. The comparator of claim 17, wherein the feedback circuit comprises a first switching element coupled between the adjustable hysteresis current source and the first node and a second switching element coupled between the adjustable hysteresis current source and the second node, the feedback circuit further comprising an inverter coupled between an input for the first switching element and an input to the second switching element.

24. A method for converting a differential signal to a logical signal, the method comprising:
   receiving, with a buffer circuit, the differential signal;
   providing a hysteresis current to a first node of the buffer circuit in response to the logical signal being a high voltage signal;
   providing the hysteresis current to a second node of the buffer circuit in response to the logical signal being a low voltage signal;
   providing, by the buffer circuit, an output differential voltage based on the received differential signal and the provided hysteresis current, wherein the output differential voltage is adjusted in response to one of the first node or the second node receiving the hysteresis current; and
   converting, with an amplifier circuit, the output differential voltage to the logical signal.

25. The method of claim 24, wherein the converting the output differential voltage includes:
   providing the high voltage signal as the logical signal in response to the output differential voltage being greater than a threshold; and
   providing the low voltage signal as the logical signal in response to the output differential voltage being less than the threshold.

26. The method of claim 24, further comprising generating, by the buffer circuit, a first voltage threshold in response to receiving the hysteresis current at the first node, wherein providing the output differential voltage includes providing a negative output differential voltage in response to a voltage of the differential signal being less than the first voltage threshold.

27. The method of claim 26, further comprising generating, by the buffer circuit, a second voltage threshold in response to receiving the hysteresis current at the second node, wherein providing an output differential voltage includes providing a positive output differential voltage in response to the voltage of the differential signal being greater than the second voltage threshold.

28. The method of claim 27, further comprising selecting a level for the hysteresis current, wherein the selected level of the hysteresis current results in an adjustment of the first voltage threshold and the second voltage threshold.

* * * * *